United States Patent [19]
Patzig et al.

[11] Patent Number: 5,205,514
[45] Date of Patent: Apr. 27, 1993

[54] ARRANGEMENT OF AT LEAST ONE SENSOR ON THE LANDING GEAR OF AN AIRCRAFT FOR MEASURING ITS WEIGHT AND POSITION OF CENTER OF GRAVITY

[75] Inventors: Hans-Norbert Patzig, Bad Homburg; Klaus Schult, Frankfurt am Main, both of Fed. Rep. of Germany

[73] Assignee: VDO Adolf Schindling AG, Frankfurt am Main, Fed. Rep. of Germany

[21] Appl. No.: 763,642

[22] Filed: Sep. 23, 1991

[30] Foreign Application Priority Data

Oct. 20, 1990 [DE] Fed. Rep. of Germany ....... 4033429
Apr. 18, 1991 [DE] Fed. Rep. of Germany ....... 4112675

[51] Int. Cl.$^5$ ............................................... B64C 25/00
[52] U.S. Cl. ................................. 244/103 R; 73/65.01
[58] Field of Search ............ 244/100 R, 75 R, 103 R; 73/65; 177/136-137; 364/463, 567

[56] References Cited
U.S. PATENT DOCUMENTS
4,782,706 11/1988 Kister et al. .................. 73/65

FOREIGN PATENT DOCUMENTS
| | | |
|---|---|---|
| 0026446 | 4/1981 | European Pat. Off. . |
| 0054453 | 6/1982 | European Pat. Off. . |
| 0232535 | 8/1987 | European Pat. Off. . |
| 3626127 | 3/1987 | Fed. Rep. of Germany ... 244/100 R |
| 2520870 | 8/1983 | France ............................ 244/100 R |
| 2564582 | 11/1985 | France . |

*Primary Examiner*—Galen Barefoot
*Attorney, Agent, or Firm*—Martin A. Farber

[57] ABSTRACT

An arrangement in which at least one sensor is provided on the landing gear of an aircraft for measuring its weight and the position of its center of gravity, and in which a sensor for a measurement of shear is arranged at a measurement point formed by a pair of lugs on an axle or bogie beam. The axle (9) or bogie beam is of constant cross section above the measurement point and symmetrical to a vertical axis which lies centrally between the two lugs of a pair (10, 13 and 14, 15 respectively).

8 Claims, 5 Drawing Sheets

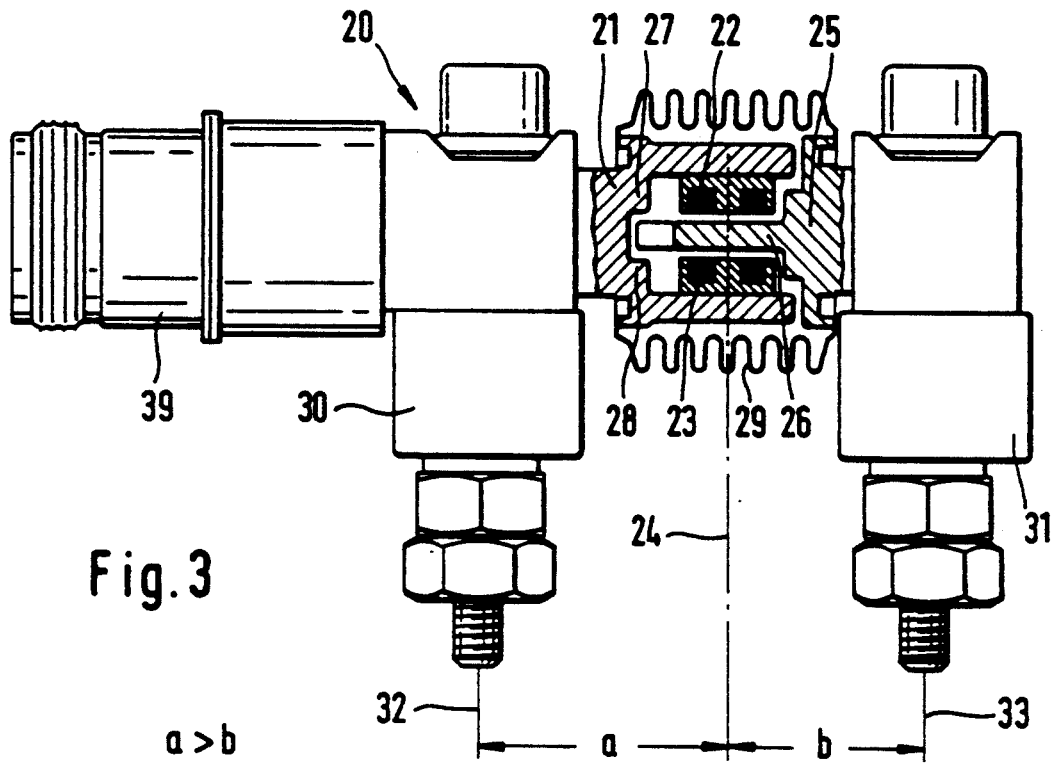
Fig.3    a > b
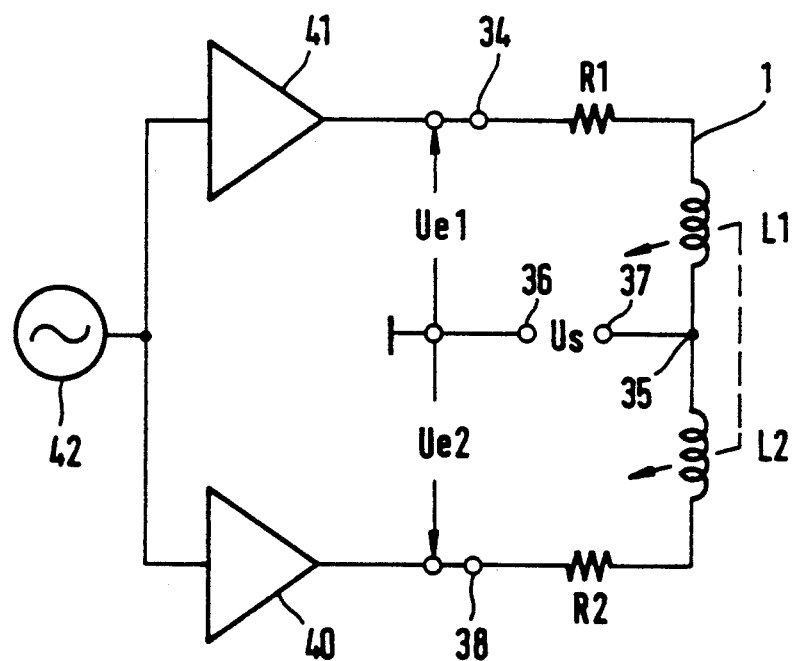
Fig.4

ARRANGEMENT OF AT LEAST ONE SENSOR ON THE LANDING GEAR OF AN AIRCRAFT FOR MEASURING ITS WEIGHT AND POSITION OF CENTER OF GRAVITY

FIELD AND BACKGROUND OF THE INVENTION

The present invention relates to an arrangement of at least one sensor on the landing gear of an aircraft for measuring the weight and position of the center of gravity of the aircraft.

In the arrangements of this type which are known from actual practice, there are provided, in particular, inductive sensors of the type having two series-connected coils which are arranged, one above the other, with a common center line in a first sensor part, and having a tongue of thermomagnetic material which is movable in the coils and is part of a second sensor part. The first and second sensor parts are arranged on respective lugs of a pair of lugs which protrude at the measurement point from an axle or a bogie beam of an aircraft landing gear. The series-connected coils of the sensor act as inductive voltage divider and give off a signal when the vertical position of the tongue is displaced with respect to the coils. In the ideal case, the sensor only measures the shear which is caused by the load introduced into the landing gear of the axle or of the bogie beam in the region of the measurement point on which the sensor is arranged.

The errors which cause the result of the measurement to deviate from the ideal case include an error which is due to the loading and unloading effect. It is based on the fact that upon the loading and unloading of an aircraft, the bending of the load bearing parts in the landing gears depends on whether or not the aircraft moved — rolled — after the loading or unloading. Before the loaded aircraft is moved, a load is introduced closer to an inner wheel bearing than to an outer wheel bearing due to the action of a lateral force which acts on the tires and attempts to broaden the track of the axle. After movement of the aircraft, the lateral force disappears due to the change in the frictional conditions with respect to the ground, which permit a change in track. The vertical introduction of load due to the weight then takes place centrally between the inner and outer wheel bearings.

In order to describe the error known as loading or unloading effect, one can view the above-described migration of the introduction of the load as breaking down into a fixed introduction of load centrally between the wheel bearings, and a variable bending moment or moment of rotation as a function of the change in track. These moments are introduced into the axle at the wheel bearings. In addition to a bending of the axle, the weight-induced fixed introduction of load causes a shear, which is to be measured. Corresponding to the shear, the sensor experiences a deflection which is proportional to the weight. The moment of rotation or bending moment produced by the loading or unloading causes an additional bending which superimposes itself on the bending from the fixed load introduction and does not come directly from the load but from the lateral force on the tire. In the case of the conical development of the axle which is customary in practice, its strength decreases from the middle outward towards the wheel. This has the result that the curvature of the bending line is less at an inner sensor attachment point, which is located close to the center point, than the curvature on the outer sensor attachment point since the axle has a higher strength further inward than it has on the outside. It may be noted at this point that the loading effect is dependent on the size of the load and increases with the latter. By loading, refueling of the aircraft is also understood.

SUMMARY OF THE INVENTION

It is an object of the invention further to develop the arrangement of a sensor on the landing gear of a vehicle for the measurement of its weight and its position of center of gravity, of the type described above, in such a manner that the influence of the loading and unloading effect on the output variable of the sensor is eliminated as far as possible.

This object is achieved in a first embodiment by the development of the axle or bogie beam above the point of measurement.

According to this, the present invention provides an arrangement of at least one sensor on the landing gear of an aircraft for measuring its weight and the position of its center of gravity in which the sensor, for the measurement of the shear, is arranged at a measurement point which is formed by a pair of lugs on an axle or bogie, wherein the axle (9) or bogie beam is of constant cross section above the measurement point and symmetrical to the vertical axis which lies centrally between the two lugs of a pair (10, 13 or 14, 15).

The increase in the accuracy with which the device measures the weight and the position of the center of gravity of the aircraft is of considerable importance for the profitability of air transport since, in this way, the aircraft can be loaded with closer tolerance close to a pre-determined limit value — the maximum take-off weight.

The arrangement of the sensor proposed by the invention with the axle or bogie beam developed above the measurement point with — seen in axial direction — a constant cross sectional shape which is symmetrical to the vertical axis is realized in particularly suitable manner by an axle (9) or bogie beam which is tubular, i.e. shaped as a hollow cylinder, at least at the measurement point.

The arrangement of the sensor proposed by the invention with an especially developed axle or bogie beam is, in general, suitable for sensors having two sensor parts which are arranged spaced from each other on the lugs of the axle or bogie beam, the sensor giving off an output signal which corresponds to a vertical displacement between the lugs of a pair. They can, for instance, be capacitive sensors. However, inductive sensors of the type having two coils connected in series and a tongue of ferro-magnetic material which is movable in the coil are preferably used.

Both in the case of the general principle of the inventive development of the axle, which is of constant cross section above the measurement point and symmetrical to the vertical axis and in the case of a preferred embodiment in accordance with which the axle is tubular at least at the measurement point — with constant wall thickness — the result is obtained that the additional bending of the axle which occurs upon loading due to the lateral forces of the wheels, is circular in axial direction. With the circular bending, a sensor of conventional construction, particularly an inductive sensor which has equal distances (a, b) between a center line of the two coils and an attachment point of the first sensor part containing the coils on the one hand and, on the other hand, between said center line and an attachment point of the second sensor part having the tongue, experiences merely a buckling in the region of the center line and not a vertical deflection of the tongue with respect to the coils. This buckling without vertical deflection of the tongue has no influence on the output variable of the sensor. The loading and unloading error is thus eliminated.

Without any influence of the lateral forces, only the shear of the axle at the measurement point and the bend thereof are measured, which can be shown in a bending graph as a curve of third order, i.e., as a cubic parabola of constantly varying curvature. In other words, the symmetrical sensor in combination with an axle as elastic body which is of constant cross section above the measurement point and symmetrical to the vertical axis, produces an output signal which is a function of the weight resting on the axle while there are either no other influences on the output signal, or the influences can at least be compensated by additional measures. The latter is true of another possible measurement error, namely the torsion error which can occur upon braking or upon moving along curves or even when standing if the entire landing gear or individual wheels are on uneven ground.

The development of the axle or bogie beam with constant cross section and symmetrical to the vertical axis, which is prescribed according to the first embodiment of the invention, cannot always be realized in practice with certain landing gears without impermissibly weakening the corresponding parts of the gear. A second embodiment according to the invention can, therefore, be used in the case of an axle or bogie beam which is not of constant cross section above the measurement point and symmetrical to the vertical axis but is, for instance, conical. With such a shape of the axle or bogie beam in accordance with a second embodiment of the invention, the influence of the loading and unloading effect on the measurement of the weight and of the position of center of gravity of the aircraft is nevertheless eliminated if the inductive sensors used for the measurement are developed asymmetrically in the manner that a first sensor part (21) attached to one lug of the pair and a second sensor part (25) arranged on the other lug of the pair differently influence a mutual relative movement which causes an electric output variable.

Such an asymmetric inductive sensor is so arranged on a conical axle that the sensor part having the greater distance between the center line of the two coils and the point of attachment of this sensor part is located on the side of larger diameter of the conical axle, and the sensor part having the smaller distance between the center line of the two coils and the point of attachment of this second sensor part is associated with the tapered part of the axle. With the asymmetric sensor, the effect of the smaller curvature of the line of bend of the axle or bogie beam on the inner sensor attachment point as compared with the larger curvature of the line of bend on an outer sensor attachment point is thus compensated for.

The influence of the loading and unloading effect on the measurement of the weight and of the position of the center of gravity of the aircraft can, however, be eliminated even if the axle or bogie beam is not of constant cross section above the measurement point and symmetrical to the vertical axis, and if symmetrical sensors are used.

According to the invention, there is provided an arrangement of at least one sensor on the landing gear of an aircraft for measuring the weight and position of the center of gravity of the aircraft which has at least one sensor of the symmetrical type, the sensor for the measurement of the shear being arranged at a measurement point formed by a pair of lugs on an axle or bogie beam, wherein, in the case of a development of the axle or bogie beam which is not of constant cross section above the measurement point and symmetrical to the vertical axis, the lugs (53, 54) of, in each case, one attachment pair are developed with unequal undercuts (57-60) in the manner that the undercuts (57, 58) on an outer side (55, 56) extend more deeply into the lugs than undercuts (59, 60) on the corresponding opposite inner side of the lugs.

In this case, a compensating of the effect of the smaller curvature of the line of bend of the axle or bogie beam on the inner sensor attachment point, as compared with the larger curvature of the line of bend on an outer sensor attachment point, is provided in the manner that the lugs, serving as sensor attachment points, of each of such attachment pair are developed with unequal undercuts or tapers in the manner that the undercuts on an outer side, which thus lies on the tapered section of the axle or bogie beam, extend more deeply into the lugs than undercuts on the corresponding opposite inner side of the lugs.

According to a feature of the invention, there is provided as sensor an inductive sensor of the type having two series-connected coils and having a tongue of ferromagnetic material which is movable in the coils.

There is preferred as a sensor an inductive sensor of the type having two series-connected coils (22, 23) in a first sensor part (21) and having a tongue (26) of ferromagnetic material which is movable in the coils and is part of the second sensor part (25).

Also, according to the invention, the sensor of asymmetrical construction has unequal distances (a, b) between a center line (24) of the two coils (22, 23) and an attachment point (32) of the first sensor part (21) containing the coils on the one hand and, on the other hand, between said center line (24) and an attachment point (33) of the second sensor part (25) having the tongue (26). This sensor has different distances between a center line of the two coils and an attachment point of the first sensor part containing the coils on the one hand and, on the other hand, between said center line and an attachment point of the second sensor part having the tongue.

BRIEF DESCRIPTION OF THE DRAWING

With the above and other objects and advantages in view, the present invention will become more clearly understood in connection with the detailed description of preferred embodiments, when considered with the accompanying drawings, of which:

FIG. 3 is a longitudinal section through an asymmetrically developed sensor;

FIG. 4 is an electric circuit of the sensor of FIG. 3;

DETAILED DESCRIPTION OF THE PREFERRED EMBODIMENTS

Figure 1:
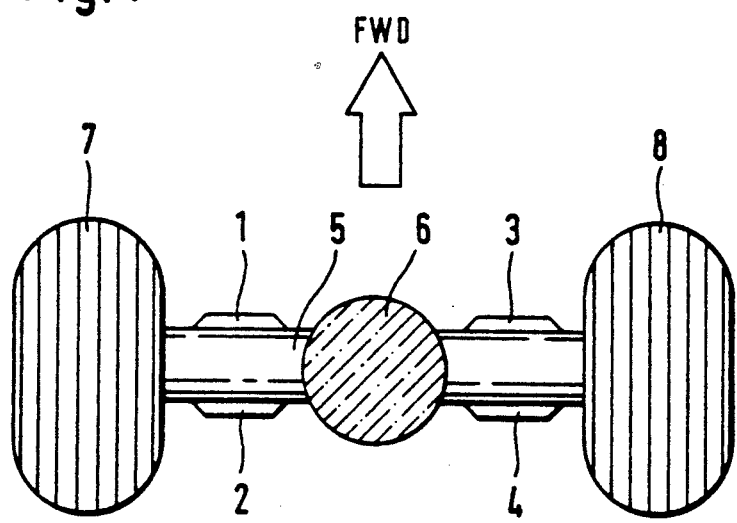
FIG. 1 shows an arrangement of four sensors on the landing gear of an aircraft, shown diagrammatically in top view.

FIG. 1 shows an arrangement of four sensors 1-4, on an axle 5 of an aircraft landing gear which is connected to the aircraft via an oil shock absorber 6, shown in cross section. Wheels which are mounted on the tubular axle bear the reference numbers 7, 8. The sensors 1, 2 and 3, 4 respectively are arranged diametrically opposite each other on the axle in pairs in order to compensate for a torsional error, which is not of concern here. The sensors are spaced equally from an imaginary center point of the oil shock absorber 6.

Figure 2:
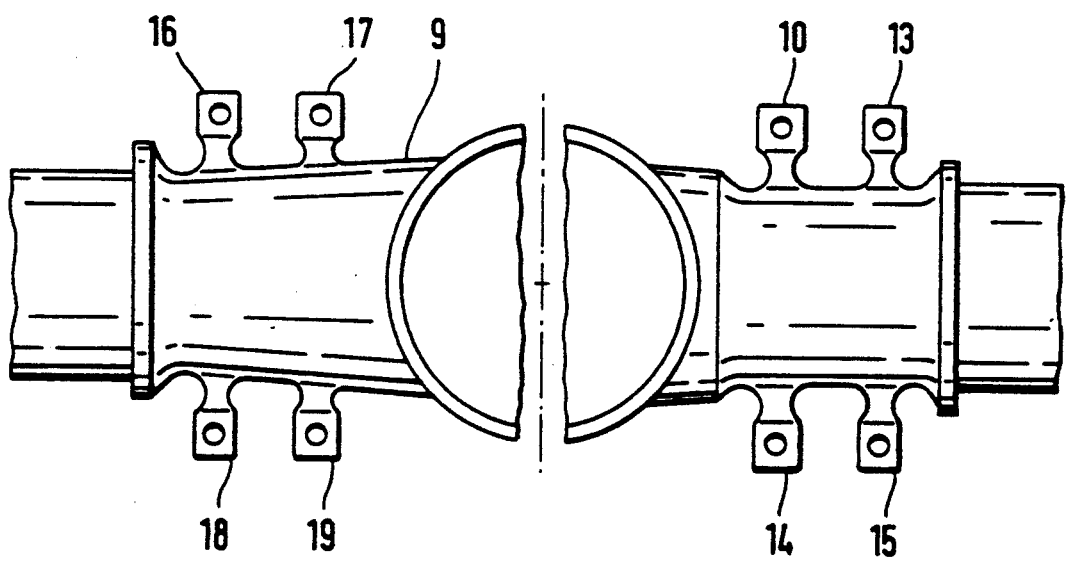
FIG. 2 is an arrangement and development of pairs of lugs for the attachment of sensors on an axle, shown in top view.

FIG. 2 shows an axle 9, the left part of which is developed conically in conventional manner but the right part of which is cylindrical, in accordance with the invention, in the region of lugs 10 to 15. The cylindrical development of the axle shown on the right is preferred since, in this case, an error caused by the loading and unloading effect when using conventional symmetrical sensors arranged on the lugs 10, 13 and 14, 15 does not occur. Frequently, however, only the conical part of the axle shown on the left can be realized since this part has the strength characteristics originally provided by the manufacturer. Therefore, in accordance with the invention, asymmetrical sensors are mounted on the lugs 16, 17 and 18, 19 of this part in order to avoid the error caused by the loading and unloading effect.

FIG. 3 shows a sensor, designated generally 20, in side view, partially in section. Two horizontal coils 22, 23 are arranged one above the other in a fork-shaped first sensor part 21. A common center line which lies in the sensitive center points of the coils and passes through the coils is indicated in dash-dot line and bears the reference numeral 24. A second sensor part 25 which extends into the first sensor part is provided with a tongue of soft ferro-magnetic material 26 which extends into a space between the two coils 22 and 23 in the first sensor part. The tongue is movable within this space in any direction as long as it does not strike against the stops 27, 28. The inside of the first and second sensor parts is screened off from environmental influences by a bellows 29 which connects the two sensor parts. It furthermore can be noted from FIG. 3 how the first sensor part 21 and the second sensor part 25 are screwed onto lugs 30 and 31 respectively. Imaginary central attachment points of these screw connections are indicated in dash-dot line and designated 32 and 33 respectively.

The sensor shown in FIG. 3 is asymmetrical, that is to say the distance a between the attachment point 32 of the first sensor of part 21 and the center line 24 through the two coils on the one hand is larger than the distance b between the attachment point of the second sensor part 25 and the center line 29 through the two coils on the other hand.

As an alternative to this, in another embodiment, the distance a can also be smaller than the distance b.

The asymmetrical sensors are preferred for installation on an axle or bogie beam which is developed conically in customary manner in accordance with the left part of the axle 9 in FIG. 2.

In the case of an axle shaped as a tube or hollow cylinder in accordance with the right-hand side of the axle 9 in FIG. 2 or a corresponding bogie beam as place of attachment for the sensors, symmetrical sensors are, however, used in the case of which the distances a and b are equal to each other.

Regardless of whether there is concerned a symmetrical or an asymmetrical sensor, the sensor forms output signals in accordance with the principle of inductive voltage division at the two series-connected coils 22 and 23 as a function of the position of the tongue 26. In detail, the sensor measures the vertical position and the tongue 26 between the two coils 22 and 23 or the vertical displacement with respect to the central starting position shown respectively. A mere swinging of the tongue around an imaginary center point which lies in the center line 24, or a horizontal displacement has no influence on the output variables of the sensor.

The sensor of the type shown in FIG. 3, whether it be asymmetrical or symmetrical, is also referred to as a shearing force sensor since, by means of the vertical displacement of the tongue 26 with respect to the coils 2 and 23, it also measures the shearing force which acts on the axle or bogie beam to which the sensor is connected via the lugs 30 and 31. The sensor, however, does not experience any deflection if the axle or bogie beam exhibits no curvature of the neutral line or line of bend in the region of the lugs or if the curvature is uniform or center symmetrical.

A circuit arrangement in which a sensor according to FIG. 3 is arranged, is shown in FIG. 4. In it, the terminals which are seated in a junction box 39 in FIG. 3 are designated 34, 37, 38. In FIG. 4 the sensor is shown as equivalent circuit diagram. The active inductances of the two coils 22 and 23 of FIG. 3 which are connected together at a point 35 are designed L1 and L2. These inductances can be influenced in opposite direction by the tongue 26 as is indicated in FIG. 4 by the arrows connected by a dashed line. R1 and R2 are compensating resistors which represent the ohmic resistances of the coils 22 and 23 and of their feed lines. The two coils are acted on with opposite-phase exciter voltages Ue1 and Ue2 by means of amplifiers 40 and 41 which are controlled by a source of alternating voltage 42. An output voltage or sensor voltage Us between the terminals 36 and 37 constitutes a measure of the displacement of the tongue, which influences the amount of the inductances L1 and L2.

In the following, the mechanical aspects of the invention will be discussed to the extent that they are of interest for the deflection of the sensor parts and for the forming of the electric output signal of the sensor.

Figure 5:
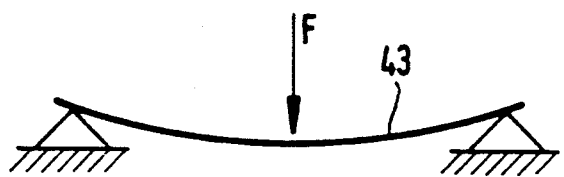
FIG. 5 shows a line of bend of an elastic body which is of constant cross section and symmetrical to the high axle which is merely stressed by a force or weight F, the body representing an axle or bogie beam of a landing gear.

First of all, we proceed from the first aspect of the invention, namely, a development of the axle above the measurement point which is of constant cross section and symmetrical to the vertical axis. Such a tubular development is shown in the half axle of the axle 9 shown on the left side in FIG. 2. It has been found that with such a development of the axle or half axle above the measurement point with a symmetrical sensor, in which, therefore, the distances a and b of FIG. 3 are equal, only the deformation caused by the weight is measured. But there is no measurement of an additional component caused by the loading and unloading effect which is produced by the lateral forces on the wheels (not shown). By way of explanation of this, FIG. 5 shows how a vertically acting weight or a force F acts on an axle which is supported on both ends and the neutral line, or line of bend, of which is designated 43. The line of bend is a cubic parabola of continuously varying curvature, which means that a symmetrical sensor which is arranged on the axle in the region of this line of bend experiences a deflection which in its turn means an output signal proportional to the force F.

Figure 6:
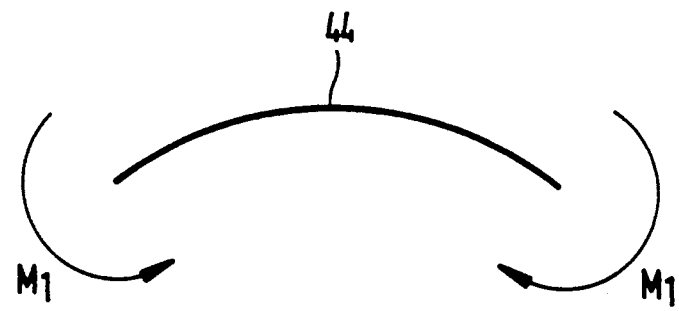
FIG. 6 is a line of bend which is caused by the bending moment from a change in the track of the axle of FIG. 5.

FIG. 6 shows a corresponding line of bend 44 of the same axle which is caused by the pair of bending moments $M_1$ acting on the wheels. With the above-described development of the axle as elastic body of constant cross section and symmetrical to the vertical axis, for instance a tube, the line of bend between the points of attack of the moments represents a portion of a circle. A sensor of the symmetrical type described which is arranged on the axle in the region of this line of bend does not experience any deflection. This means that the loading and unloading effect is not included in the output signal of this sensor.

Figure 7:
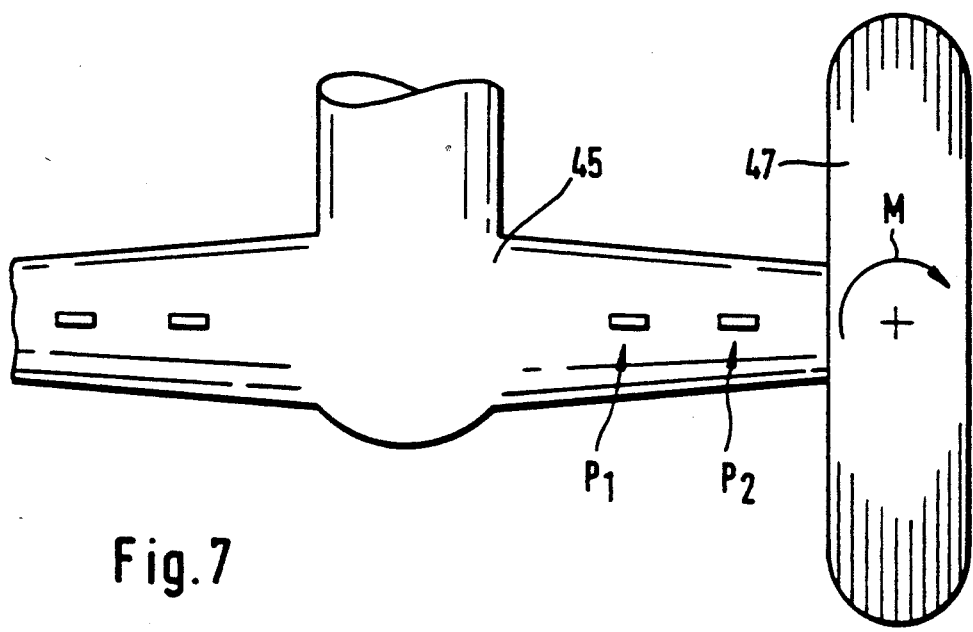
FIG. 7 is a front view of part of an axle of an aircraft with conically developed half axles.
Figure 8:
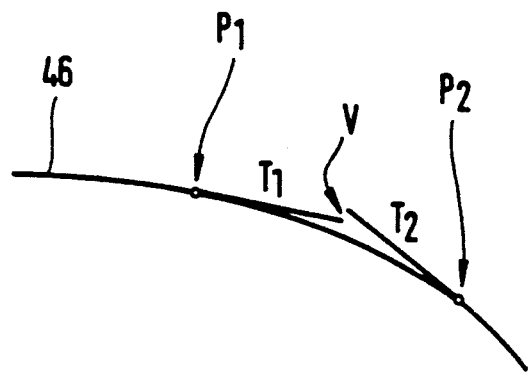
FIG. 8 is the line of bend of a half axle, which line of bend is produced by a bending moment as a result of a change in track, with tangents $T_1$ and $T_2$ of two halves of a symmetrical sensor arranged on the axle.
Figure 9:
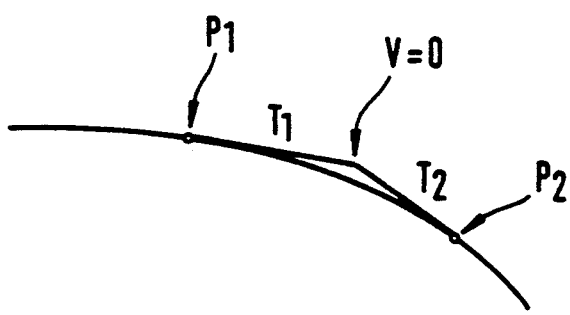
FIG. 9 is a line of bend corresponding to the line of bend of FIG. 8 but with an asymmetrical sensor.

In accordance with the second aspect of the invention, however, deflection of the two sensor parts with respect to each other is avoided in the inductive sensor of the type described even if the axle or bogie beam on which the sensor is attached is not of constant cross section above the measurement point and symmetrical to the vertical axis of plane since an asymmetrical sensor is used in the case of which the distances a and b of FIG. 3 are therefore different. This will be explained further with reference to FIGS. 7 to 9:

FIG. 7 shows in front view an axle 45 of the aircraft, the half axles of which are of conical shape. A pair of lugs for mounting a sensor is designated $P_1$, $P_2$;

FIG. 8 shows a line of bend 46 which corresponds to a half axle of the axle 45 and which is caused nearly by a moments M which is produced on wheels — one wheel 47 is shown in FIG. 7. The pair of moments of rotation M represents in this connection the loading and unloading effect which tries to falsify the weight measurement result. If a symmetrical sensor and, therefore, a sensor the distances a and b of which FIG. 3 are equal, is mounted on the lugs $P_1$, $P_2$, this means that, as a result of the slighter curvature of the half axle of the axle 45, an inner tangent portion $T_1$ is less deflected in the inner region than an outer tangent portion $T_2$. Each of the tangent portions extends in this connection between one of the lugs $P_1$ and $P_2$ on which one of the sensor parts is arranged and the end of said sensor part at the center line which extends centrally through the two coils. As can be noted from FIG. 8, the ends of the tangent portions $T_1$ and $T_2$ lying in the region of the center line are staggered with respect to each other by a stagger V which produces an erroneous output signal of the sensor.

However, if the sensor is asymmetrical, with different distances a and b according to FIG. 3, and these distances are suitably dimensioned in such a manner that the different curvatures at the inner attachment point or lug $P_1$ and the outer attachment point or lug $P_2$ produces the same deflections of the ends of the tangent portions opposite these attachment points, then the stagger V of the ends of these two tangent portions becomes zero. Such an asymmetrical sensor, therefore, does not experience any deflection which is caused by a torque due to the lateral forces acting on the wheels and falsifies the result of the weight measurement.

Figure 10:
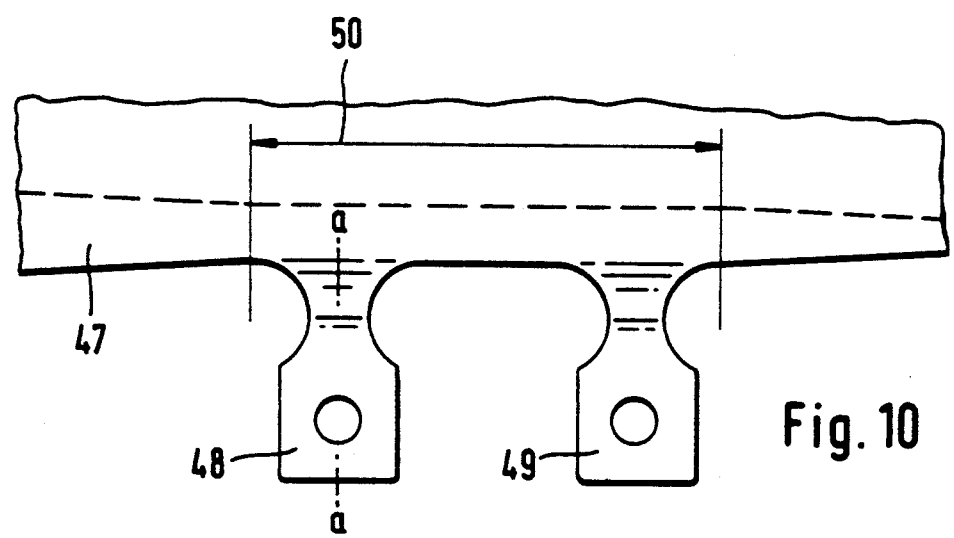
FIG. 10 is a part of an axle developed in accordance with the invention, shown in side view.

FIG. 10 shows a portion 47 of the axle in the region of the lugs 48 and 49. In order to avoid the loading and unloading effect upon the weight measurement, it is sufficient that the portion 50 above the measurement point established by the lugs 48, 49 be cylindrical. Outside this portion 50, the axle can be conical.

Figure 11:
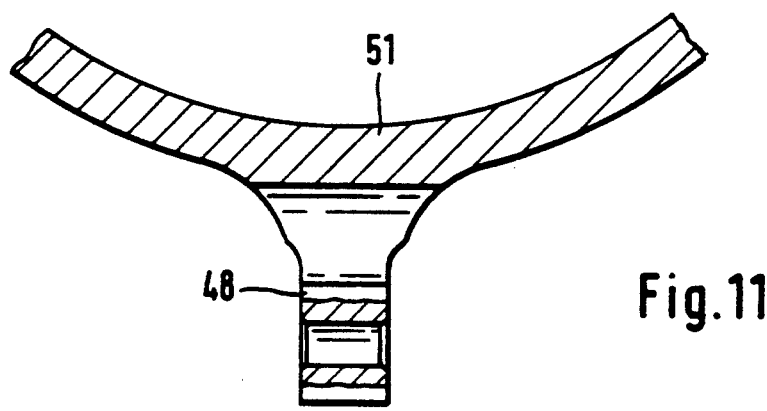
FIG. 11 is a cross section through the part shown in FIG. 10 along the plane a—a.

FIG. 11 shows a corresponding tubular cross sectional portion 51 partially in the plane a-a which is indicated in FIG. 10 within the portion 50.

Figure 12:
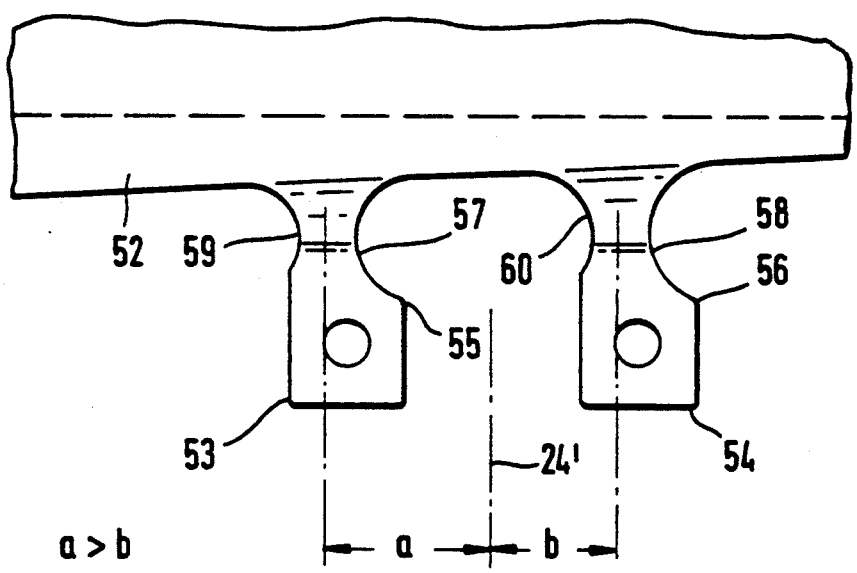
FIG. 12 is a part of an alternative axle developed in accordance with the invention, shown in side view.

FIG. 12 shows an axle portion 52 similar to the axle portion 47 of FIG. 10, in which case, however, the lugs 53, 54 of the axle portion 52, differing from the lugs 48, 49 of the axle portion 47, are asymmetrical, as will now be explained further: The asymmetry consists therein that the lugs on an outer side 55 and 56 have deeper tapers or undercuts 57, 58 than flatter undercuts 59, 60 on the opposite unnumbered inner sides of the lugs. Accordingly, a distance a between a center line through the tapered section of the lug 53 and a center line 24' between the two lugs is greater than a distance b between said center line 24' and a center line through the tapered section of the lug 54. By the same designation of the distances a, b as in FIG. 3, it is indicated that in the alternative of FIG. 12 there is the same result in the final analysis on the stagger between the ends of the first sensor part and the second sensor part. One of the ends, in each case, is attached to the lug 57 and 58, respectively, as explained with reference to FIG. 3, although, in the alternative embodiment of FIG. 12, the sensor parts of a symmetrical inductive sensor are attached on the lugs 53, 54 in contrast to the asymmetrical sensor of FIG. 3.

We claim:

1. A system of sensors for a landing gear of an aircraft, comprising at least one sensor on a landing gear of an aircraft for measuring weight of the aircraft and the position of the center of gravity of the aircraft, wherein the landing gear includes an axle or bogie beam, and a sensor for a measurement of shear is arranged at a measurement point, there being a pair of lugs located on the axle or the bogie beam at the measurement point; and the axle or the bogie beam varies in cross section at the measurement point and is asymmetrical about a vertical plane which bisects said at least one sensor and lies centrally between the pair of lugs, there being a larger cross section to one side of the vertical plane and a smaller cross section to an opposite side of the plane; wherein the sensor comprises a first sensor part attached to a first lug of the pair of lugs and a second sensor part attached to a second lug of the pair of lugs, the first lug being at the larger beam cross section and further from the vertical plane than the second lug which is at the smaller beam cross section;

the sensor operates via an asymmetrical operation, wherein the first sensor part attached to the first lug and the second part attached to the second lug differently influence a mutual relative movement of the first and the second sensor parts to produce an electric output variable.

2. A system according to claim 1, wherein
said at least one sensor is an inductive sensor having two series-connected coils and having a tongue of ferro-magnetic material which is movable in the coils.

3. A system according to claim 1, wherein
said at least one sensor is an inductive sensor of the type having two series-connected coils in a first sensor part and having a tongue of ferro-magnetic material which is movable in the coils and is part of a second sensor part.

4. A system according to claim 1, wherein
said at least one sensor is of asymmetrical construction and comprises a first coil and a second coil and a first attachment point for said first sensor part and a second attachment point for said second sensor part; wherein
said at least one sensor has unequal distances between a center line of said first and said second coils and said first attachment point between said center line and said second attachment point.

5. A system of sensors for an aircraft landing gear, the system comprising
at least one sensor on a landing gear of an aircraft for measuring weight of the aircraft and position of a center of gravity of the aircraft, said at least one sensor being of symmetrical type;
wherein the landing gear includes an axle or bogie beam with a pair of lugs disposed on the axle or bogie beam;
the axle or bogie beam has a central portion for connection to an aircraft and two opposed end portions for connection to wheels of the aircraft, said pair of lugs is disposed on one side of said central portion and, in said pair of lugs there in an inner lug closer to said central portion and an outer lug closer to an end portion of said axle or bogie beam;
said at least one sensor provides a measurement of shear and is located at a measurement point formed by the pair of lugs on the axle or the bogie beam;
in the case of an axle or bogie beam which varies in shape of cross section at the measurement point and is symmetrical about a vertical axis passing between the lugs, the pair of lugs is developed with unequal undercuts in the manner that an undercut on an outer side of each lug in said pair of lugs extends more deeply into a lug than an undercut on a corresponding opposite inner side of each of the lugs; and
in each of the lugs, an extension of an undercut into a lug produces a reduction in cross section of the lug at the site of the undercut.

6. A system according to claim 5, wherein
at least one sensor is an inductive sensor having two-series connected coils and having a tongue of ferro-magnetic material which is movable in the coils.

7. A system according to claim 5, wherein
said at least one sensor is an inductive sensor of the type having two series-connected coils in a first sensor part and having a tongue of ferro-magnetic material which is movable in the coils and is part of a second sensor part.

8. A system according to claim 7, wherein said at least one sensor comprises:
a first sensor part having two coils serially connected;
a second sensor part having a tongue of ferromagnetic material movable within said two coils;
wherein said at least one sensor has equal distances between a center line of the two coils and an attachment point of the first sensor part and between aid center line and an attachment point of the second sensor part.

* * * * *